United States Patent [19]

Haede et al.

[11] 3,919,191
[45] Nov. 11, 1975

[54] 14,15β-EPOXYCARDENOLIDE- AND 14,15β-EPOXYBUFADIENOLIDE-GLYCOSIDES AND PROCESS FOR THEIR PREPARATION

[75] Inventors: Werner Haede, Hofheim, Taunus; Kurt Radscheit, Kelkheim, Taunus; Ulrich Stache, Hofheim, Taunus; Werner Fritsch, Neuenhain, Taunus; Ernst Lindner, Frankfurt am Main, all of Germany

[73] Assignee: Hoechst Aktiengesellschaft, Frankfurt am Main, Germany

[22] Filed: July 21, 1972

[21] Appl. No.: 274,106

[30] Foreign Application Priority Data
July 22, 1971 Germany............................ 2136654

[52] U.S. Cl.............................. 260/210.5; 424/182
[51] Int. Cl.²............................................ C07J 63/00
[58] Field of Search............... 260/210.5, 234.55 R

[56] References Cited
UNITED STATES PATENTS

| 3,211,719 | 10/1965 | Wartburg et al. | 260/210.5 |
|---|---|---|---|
| 3,398,138 | 8/1968 | Pierrfonds et al. | 260/210.5 |
| 3,585,186 | 6/1971 | Conrow et al. | 260/210.5 |
| 3,639,392 | 2/1972 | Fritsch et al. | 260/239.55 R |

*Primary Examiner*—Johnnie R. Brown
*Assistant Examiner*—Cary B. Owens
*Attorney, Agent, or Firm*—Curtis, Morris & Safford

[57] ABSTRACT

Cardioactive 3β-hydroxy-14,15β-epoxy-5β-cardenolide-or -5β-bufadienolide-glucosides and rhamnosides. A method for making these compounds by reacting the corresponding 14-anhydrocardenolides or 14-anhydrobufadienolides with an acyl-halopyranose, reacting the resultant acylated pyranoside with a hypohalous acid to form the corresponding halohydrin, and epoxidizing the halohydrin with a base.

6 Claims, No Drawings

14,15β-EPOXYCARDENOLIDE- AND 14,15β-EPOXYBUFADIENOLIDE-GLYCOSIDES AND PROCESS FOR THEIR PREPARATION

The present invention relates to 14,15β-epoxycardenolide-and 14,15β-epoxybufadienolide-glycosides to a process for their preparation.

It is known to glycosidize 3β-hydroxy-14,15β-epoxy-4,20(22)-cardenolide (cf. German Offenlegungsschrift No. 1 807 585, Example 15). The yield in this case, however, is only 12 percent.

Now it has been found that the hitherto unknown 3β-hydroxy-14,15β-epoxy-5β-cardenolide- or 5β-bufadienolide-glycosides of the general formulae I

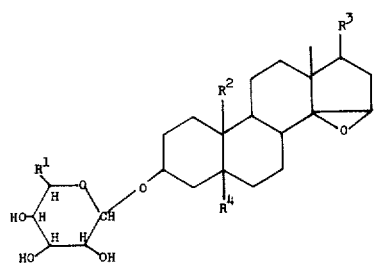

(I)

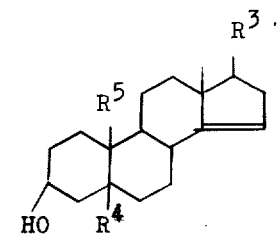

(II)

wherein $R^3$ stands for the butenolide or cumaline ring, $R^4$ stands for H or OH, $R^1$ stands for $CH_3$ or $CH_2OH$ and $R^2$ has the meaning given for $R^1$, but may also stand for an aldehyde group, can be prepared in good yield by reacting 14-anhydrocardenolides or 14-anhydrobufadienolides of the above general formula II wherein $R^4$ represents β-H or β-OH, $R^5$ represents $CH_3$, CHO or $CH_2OAc$, Ac being a low aliphatic acyl radical or an optionally substituted benzoyl radical and $R^3$ is as defined above, with acylhalogenopyranoses of the general formula III

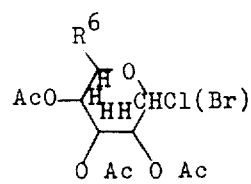

(III)

wherein $R^6$ stands for $CH_3$ or $CH_2$ O Ac, converting the acylated pyranoside of the general formula IV

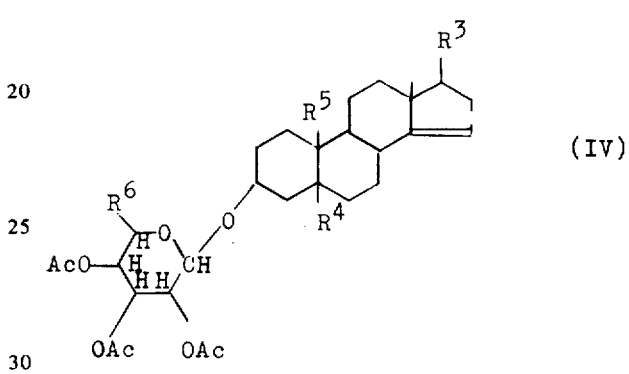

(IV)

wherein $R^3$, $R^4$, $R^5$ and $R^6$ each is as defined above, with hypohalous acid into the halogenohydrine of the general formula V

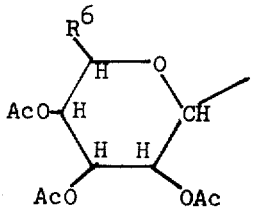

wherein $R^3$, $R^4$, $R^5$ and $R^6$ each is as defined above, and treating the compound of the general formula V with basic substances.

Suitable starting substances are the 14-anhydrocardenolides or 14-anhydrobufadienolides of the 5β-series which contain no further free hydroxyl groups capable of being glycosidized in addition to the 3β-hydroxy groups to be glycosidized. However, they may have an OH-group in the 5-position, for example. Further suitable starting substances are those carrying an oxo-group or a protected (for example, acetylated)

hydroxyl group in the 19-position, such as, for example: 14-anhydrodigitoxigenin, 14-anhydrostrophanthidin (Difugenin), 14-anhydrostrophandiol-19-acetate, 14-anhydrobufalin, and 14-anhydrohellebrigenin.

The reaction of the 14-anhydrocardenolides or 14-anhydrobufadienolides with the acylhalopyranoses is effected, in a manner known per se, according to the method of Koenigs Knorr or Helferich, with silver carbonate, silver oxide or mercury-cyanide in the solvents generally used for this reaction, such as methylene chloride, chloroform, 1,2-dichlorethane, benzene, toluene, ether or nitromethane, at a temperature within the range of 0°C. to the boiling point of the solvent. The reaction time is from 1 hour to several days. It is advantageous when using the method of Koenigs-Knorr to reflux and to separate the water, which distills off as an azeotropic mixture, by means of an apparatus generally used for this purpose or by dehydrating media.

Suitable acylhalpyranoses are the derivatives of the D- and L-series, for example, α-acetobromo-D-glucose, α-acetochloro-D-glucose, α-acetobromo-L-rhamnose, α-aceto-bromo-L-mannose, α-[p-nitrobenzoyl]-chloro-L-rhamnose, α-benzoyl-bromo-L-rhamnose, and α-acetobromo-D-galactose.

The acylated pyranosides obtained can be isolated by chromatography, but they may also be hydrolyzed while in the form of a crude product to yield the free glycosides and may be reacylated after separation of the other reaction products.

For the additionof HOCl or HOBr, the hypohalous acids are set free from N-halogeno compounds during the reaction using acids, for example by treating N-chlorosuccinimide or N-bromacetamide with perchloric acid or N,N-dibromobenzene-sulfonic acid amide with acetic acid (Ponsold reactant).

To separate the hydrogen halide for conversion into the 14,15β-epoxy compound, basic substances are used, such as sodium acetate, potassium acetate, aluminum oxide, amines, $NH_3$ or basic ion exchangers. The separation of the remaining acyl groups may also be effected by a prolonged treatment with aluminum oxide, amines or $NH_3$ or by treatment with aqueous/alcoholic solutions of bicarbonate. Both reactions are advantageously carried out in a single operation step. It appears especially advantageous to convert the 14,15-halohydrins of the acylated glycosides with alcoholic $NH_3$ at 0°C directly into the hydrolyzed 14,15β-epoxyglycosides. Total yields (glycosidation and epoxydation) of up to 50 percent are obtained.

According to the invention, the compounds described in the following Examples may also be obtained, for example:

3β-[α,L-mannopyranosyloxy]-14,15β-epoxy-5β-hydroxy-19-oxo-5β-card-20(22)-enolide, 3β-[α,L-rhamnopyranosyloxy]-14,15β-epoxy-5β-hydroxy-19-oxo-5β-bufadienolide.

The glycosides of the invention have heretofore not been known. They have a strongly positive inotropic effect on the heart muscle. Resibufogenin-rhamnoside, for example, appears to be nearly as effective as proscillaridine. This is a very surprising fact since, according to the literature, the free genin does not show any heart toxicity. (cf. L.F. and H. Fieser; Steroids, Reinhold Publ. Corp. New York 1951; page 795).

The products of the invention are very suitable for the treatment of heart diseases, especially for cardiac insufficiency, tachycardia and atrioventricular conduction and conduction along the Purkenje-system. The compounds of the invention are especially administered orally in the form of tablets or dragees, optionally in admixture with a pharmacuetically suitable carrier, for example, starch, lactose, tragacanth, magnesium stearate or talc. They may also be used as intermediates for the preparation of other cardio-active steroids.

The individual dose to be administered to human beings is from 0.1 to 0.25 mg of active substance per dosage unit (tablet).

The following Examples illustrate the invention:

EXAMPLE 1 a. 14-Anhydrobufalin-α,L-rhamnopyranoside 150 mg of 14-anhydrobufalin, 200 mg of α-acetobromorhamnose and 200 mg of silver carbonate were heated in 30 ml of 1,2-dichlorethane in a reflux condenser under a nitrogen atmosphere. (Bath temperature 120°C). To separate the water, a Soxhlet shell containing 10 g of anhydrous $CaSO_4$ was hung in the vapor chamber of the condenser. After 30 minutes, and again after 60 minutes, of 200 mg portions of α-acetobromorhamnose and 100 mg portions of silver carbonate were added. After a further 60 minutes, the filtrate of the reaction mixture was evaporated in a rotary evaporator. The residue was dissolved in 15 ml of methanol and was allowed to stand at 0° for 16 hours after the addition of 7.5 ml of a methanolic ammonia solution saturated at 0°C. The hydrolysis mixture was concentrated in a rotary evaporator to about 1 ml and the glycoside was separated after the addition of water. The crude product was dissolved in 5 of methylene chloride and the solution was concentrated to about 3 ml after the addition of 10 ml of benzene. The glycoside precipitated in microcrystalline form.

Yield: 130 mg; melting point: 174°–180°C. Infrared bands: 3430, 2920, 1740, 1715, 1630, 1530, 1445, 1370, 1230, 1115 and 1040 $cm^{-1}$; UV: λ max— = 300 mμ; ε = 5350.

b. 14-anhydrobufalin-α, L-rhamnopyranoside-20′, 3′, 4′triacetate

The glycoside was dissolved in 1 ml of pyridine and heated at 65°C for 15 minutes with 1 ml of acetic acid anhydride. Then, the solvents were separated by distillation in a rotary evaporator. The residue was dissolved in a slight amount of acetone and precipitated with water. The pasty precipitate was dried in a desiccator and again reprecipitated from acetone and water.

Yield: 150 mg; infrared bands: 2930, 1720–1750, 1635, 1530, 1445, 1365, 1210-1245, 1115 and 1040 $cm^{-1}$; UV: λ max. = 298 mμ (ε = 5200).

c. Resibufogenin-α, L-rhamnopyranoside 115 mg of 14-anhydrobufalin-α, L-rhamnopyranoside-20′, 3′, 4′-triacetate were dissolved in 2 cc. of dioxan and stirred at 0°C for 40 minutes with 90 mg of N,N-dibromobenzenesulfonamide after the addition of 0.3 cc. of $H_2O$ and 0.07 cc. of glacial acetic acid. Then, 20 cc. of ice water and 5 cc. of a saturated solution of NaCl were added to the reaction mixture. The bromohydrin which precipitated was separated by filtration and washed with water. To obtain epoxide and to separate the acetyl groups, the bromohydrin dried by suction-filtration, was dissolved in 5 cc. of methanol and 2.5 cc. of a solution of NH₃ in methanol saturated at 0°C was added at 0°C. After 16 hours the solution was evaporated to dryness in vacuo. The residue was dissolved in 10 cc. of methanol and water (1:1) and was concentrated at room temperature to 2 cc. in a rotary evaporator. The crude rhamnoside product was separated by filtration, washed with water and dried. The crude product was dissolved in 20 cc. of methylene chloride to be purified and was concentrated to 5 cc. after the addition of 20 cc. of diisopropyl ether. The rhamnoside, which separated in microcrystalline form, had a melting point of 170-180°C.

Yield: 88 mg; infrared bands at 3430, 2930, 1720, 1625, 1530, 1445, 1375, 1220, 1115, 1040 and 975 cm⁻¹; UV: λ max. = 298 mμ.

EXAMPLE 2 a. 14-anhydrodigitoxigenin-βD-glucopyranoside 2 g. of 14-anhydrodigitoxigenin, 1.3 g of silver carbonate and 1.4 g of α-acetobromoglucose were heated in 140 ml of 1,2-dichlorethane in a reflux condenser under a nitrogen atmosphere (bath temperature: 120°C). The separation of the water was carried out in the same manner as described in Example 1a. After 40 minutes, 1.86 g of α-acetobromoglucose and, after a further 50 minutes and again after 1 hour 1.63 g portions of -α acetobromoglucose and 0.65 g of silver carbonate were added. Working up was effected after a further reaction time of 1 hour and subsequent hydrolysis was effected as described in Example 1a. Yield: 1.4 g; melting point: 172°-177°C (crude product).

b. 14-anhydrodigitoxigenin-β,D-glucoside-2',3',4',6'-tetra-acetate

The glycoside obtained according to a) (1 g) was heated at 65°C for 30 minutes in 5 ml of pyridine and 5 ml of acetic acid anhydride and subsequently worked up in the same way as described in Example 1 b. Yield: 1.2 g; melting point of the partially amorphous crude product: 130°-135°C.

c. 3β-hydroxy-14,15β-epoxy cardenolide-3β[β,D-glucopyranoside]

The tetraacetate obtained according to b) (1 g) was dissolved in 18 ml of dioxan and stirred at 0°C for 50 minutes with 0.8 g of N,N-dibromobenzenesulfonamide after the addition of 2.7 ml of water and 0.625 ml of glacial acetic acid. Working up and hydrolysis were carried out in the same way as described in Example 1c. Yield: 470 mg; melting point: 178°-180°C.

EXAMPLE 3

3β-hydroxy-14,15β-epoxycardenolide-3β-[α,L-rhamnopyranoside]

3β-Hydroxy-14,15β-epoxycardenolide-3β-[α,L-rhamnopyranoside] was prepared in a analogous to that manner as described in Example 1.

The compound crystallized from methanol. Melting point: 190°-193°C.

EXAMPLE 4

3β, 5β-dihydroxy-14,15β-epoxy-19-formyl-19-norcardenolide-3α[α,L-rhamnopyranoside]

3β,5β-Dihydroxy-14,15β-epoxy-19-formyl-19-norcardenolide-3β[α,L-rhamnopyranoside] was prepared in an analogous manner as described in Example 1 from 14-anhydrostrophanthidin (Diffugenin). was carried out by preparative thin-layer chromatography on silica gel plates. As the eluant, a solution of 45% of chloroform, 45% of acetic acid ethyl ester, 9.5 % of methanol and 0.5% of water was used. Melting point: 180°-185°C.

We claim:

1. A 3β-hydroxy-14,15β-epoxy-5β-cardenolide- or -5β-bufadienolide-glucoside or -rhamnoside of the formula

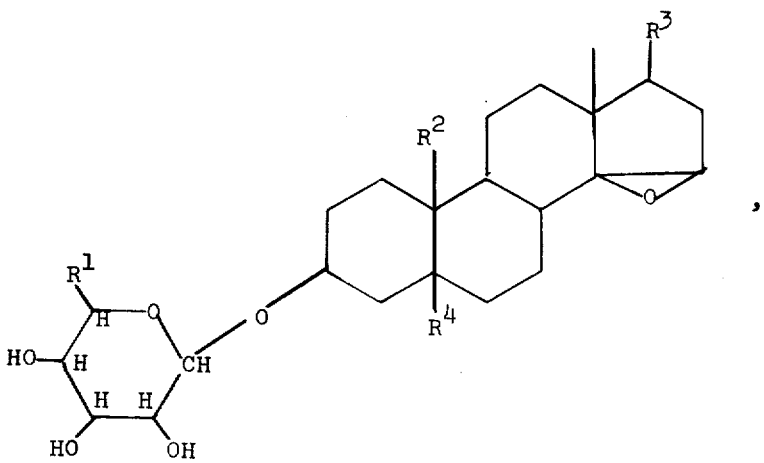

wherein R¹ is —CH₃ or —CH₂OH; R² is —CH₃, —CH₂OH, or formyl; R³ is butenolide or cumaline; and R⁴ is —H or —OH.

2. A 3β-hydroxy-14,15β-epoxy 5β-bufadienolide as in claim 1 wherein R³ is cumaline.

3. Resibufogenin -α,L-rhamnopyranoside.

4. 3β-Hydroxy-14,15β-epoxycardenolide-3β[β,D-glucopyranoside].

5. 3β-Hydroxy114,15β-epoxycardenolide-3β-[α,L-rhamnopyranoside].

6. 3β,5β-Dihydroxy-14,15β-epoxy-19-formyl-19-norcardenolide-3β[α,L-rhamnopyranoside].

* * * * *